United States Patent Office 2,863,033
Patented Dec. 2, 1958

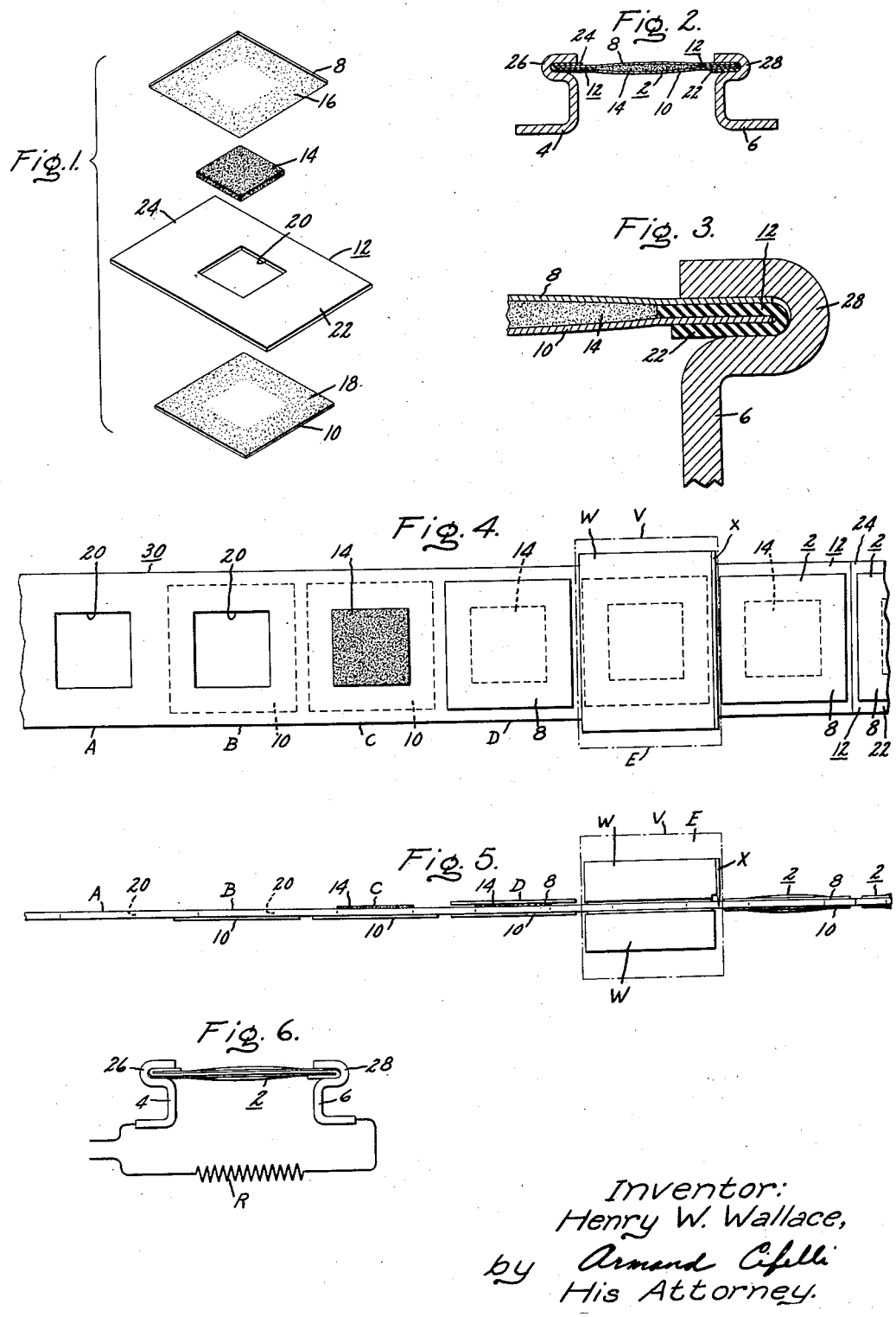

2,863,033

TEMPERATURE DETECTOR AND METHOD OF MAKING

Henry W. Wallace, Asheboro, N. C., assignor to General Electric Company, a corporation of New York Application November 29, 1954, Serial No. 471,582

19 Claims. (Cl. 201—63)

This invention relates to temperature detectors, and particularly to those which employ a thermo-sensitive electrolyte.

In many electrical devices it is desirable to control the devices by automatically regulating certain aspects of the devices in response to variations in temperature. In certain devices it is desirable to open or close an electrical circuit or transmit an electrical signal upon reaching a predetermined temperature. Electrical heating appliances, such as electric blankets, and electric toasters are exemplary of these devices, however, there are many other applications for temperature detectors of the type under consideration. When used in electric blankets they may constitute an "over-temperature cutout," i. e., they may open the circuit when a predetermined temperature is reached and thereby avoid overheating the blanket; when used in toasters they may constitute a toast "color control" in that they may be disposed to respond to the radiant energy emitted by the object being toasted to terminate the toasting cycle upon reaching a predetermined temperature which corresponds to the toast color desired. In addition to the mentioned appliances, temperature detectors may be used wherever it is desired to monitor a space and automatically react to the reaching of a predetermined temperature.

The art has recognized the usefulness of these detectors, and has expended considerable effort in the direction of improving them. One known arrangement is that of embedding a plurality of electrical conductors in the form of metallic electrodes in a mass of electrical insulating material, the electrical resistance of which changes in response to temperature changes. The material, herein called a thermo-sensitive electrolyte, has such electrical resistance properties that upon an increase in temperature, its conductivity has been altered to the point whereby it no longer constitutes an electrical insulator between the electrodes, but has become an electrical conductor. The sought for properties in these detectors are sensitive response to temperature changes and rapid recovery. Temperature detectors of the prior art type have a serious limitation as regards the enumerated desired properties in that they utilize a fraction of the potential, current-carrying capacity of the electrolyte due to the great difference in the conductance of the electrodes and the thermo-sensitive electrolyte. This obtains because electrolytic conduction is always considerably less than electronic conduction. As a result of this factor, most of the mass of electrolyte, though absorbing a major portion of thermal energy received by the detector, carries only a portion of its potential current capacity. Only that portion of the electrolyte adjacent to the electrodes carries the peak current density that the electrolyte is capable of carrying.

Another defect of prior art temperature detectors is that most of them do not afford moisture tightness; it is extremely desirable in certain applications of temperature detectors of the type under consideration that the detector be encased in a flexible, moisture-tight jacket. When used in electric blankets, for example, they should be moisture-tight for the practical reason of permitting laundering of the blanket.

It is an object of this invention to provide a temperature detector which is sensitive to temperature changes, recovers rapidly therefrom and which is encased in a flexible, moisture-tight jacket.

It is another object of this invention to provide a temperature detector that avoids the deficiencies of the prior art devices, which is simple in construction, inexpensive to produce and which lends itself to mass production techniques.

It is still another object of this invention to provide an improved method of making temperature detectors.

Some of the objects of this invention are accomplished in one form by constructing the detector of a plurality of flat members in the nature of a laminated construction; in this form the electrodes comprise flat metal foils that sandwich a tablet of a thermo-sensitive electrolyte therebetween.

The above and other objects and further details of that which I believe to be novel and my invention will be clear from the following description and claims taken with the accompanying drawing, wherein:

Figure 1 is an exploded view of one form of construction of a temperature-sensitive element which is a part of my improved temperature detector, the uppermost member being turned up for clarity.

Figure 2 is an elevation view of my improved temperature detector, i. e., one of the temperature-sensitive elements mounted in a pair of brackets, the brackets being shown in cross section.

Figure 3 is an enlarged view of the right-hand side of Figure 2 through a portion of an element and one of its mounting brackets.

Figure 4 is a diagrammatic, plan view of a method of making temperature-sensitive elements.

Figure 5 is a diagrammatic, side elevation view of the method shown in Fig. 4.

Figure 6 is a diagrammatic view of an electrical circuit which includes my improved temperature detector.

Referring to the drawings, and particularly to Figure 2, the major components of the temperature detector envisaged by my invention will be seen to comprise the temperature sensitive element 2 and brackets 4 and 6. As will become apparent, the brackets 4 and 6, which may be formed of metal, constitute mounting brackets and electrical terminals for the element 2. The detailed construction of the element 2 will be seen in Figures 1 and 3; in Figure 3 the parts are shown assembled, and in Figure 1, they are shown individually. The element 2 comprises a pair of generally flat metal foils 8 and 10, insulating plate 12, and a tablet 14 of thermo-sensitive electrolytic material.

Members 8 and 10 are designated as foils throughout this specification, however the term is intended to embrace in addition to very thin leaves of metal, metal sheets that are heavier or thicker than such leaves. Foils 8 and 10 are preferably made of a good thermal conducting material, such as tin, and on their opposing faces have their marginal portions covered with a bonding agent, such as an adhesive or cement, indicated respectively by the lined areas 16 and 18.

Tablet 14 is illustrated as being generally square in outline, however, it may be circular, rectangular, or any other reasonable geometric configuration. It is desirable that the top and bottom of the tablet be convex over most of their area for the purpose of improving surface contact between the tablet and the foils when the element is manufactured. Tablet 14 is made of a thermo-sensitive electrolyte; as used herein this term is defined as any ion conducting material whose electrical resistance varies with temperature changes. Typical examples of materials which may be used are oxalic acid, formic acid and acetamide. A preferred material is oxalic acid, and a particularly effective manner of making a tablet is to compress ground oxalic acid in a heated mold.

Insulating plate 12 is made of an insulating material and has an opening 20 formed centrally thereof which is similar in shape to that of the table 14. The plate 12 is longer than the foils and has end portions 22 and 24 that overlap the foils 8 when these parts are placed in juxtaposition with the foils disposed centrally of the plate.

The temperature sensitive element components just described are assembled in the following manner:

The tablet 14 is positioned within the opening 20 in insulating plate 12. Metal foil 8 is positioned on top of the insulating plate and metal foil 10 is positioned on the bottom thereof, the foils closely embracing the tablet and sandwiching the tablet therebetween so as to be in good electrical contact therewith. The metal foils 8 and 10 are bonded to opposite sides of the insulating plate 12 by the bonding agent 16 and 18 which is contiguous with the plate. If it is desired, the bond may be further improved by the impregnation or coating of insulating plate 12 with an appropriate bonding compound which will join the bonding agent on the metal foils when subjected to heat and pressure. It is possible, and it might be desirable, to eliminate the application of bonding agent 16 and 18, to the metal foils 8 and 10, and employ only a bonding agent carried by the insulating plate 12.

After the element has been assembled and bonded together into a unitary structure, the end portions 22 and 24 of insulating plate 12 extend beyond the metal foils 8 and 10. These end portions are folded back against the sides of the foils; this can be clearly seen in Figure 2 where it will be observed that when folded back, one end portion (22) is contiguous with one of the foils (10) and the other portion (24) is contiguous with the other foil (8). The folded over ends of the element are received respectively in the seats 26 and 28 which are part of the mounting brackets 4 and 6, respectively. The insulating plate 12 performs the function of positioning the tablet 14 and insulating the area around it, and its ends 22 and 24 perform the dual functions of constituting mounting cushions about which the seats of the brackets may be positioned, and of permitting each of the brackets to make electrical contact with only one of the foils. A particular facile manner of mounting an element in the brackets is to crimp the bracket seat portions 26 and 28 over the folded back ends of the element.

The operation of the temperature detector is as follows:

Appropriate electrical wires are connected to the brackets 4 and 6, and the electrical component to be energized at the predetermined temperature is placed in the circuit. An exemplary circuit is illustrated diagrammatically in Figure 6 wherein the temperature detector is shown in the circuit with a heater R to be energized at a predetermined temperature. The circuit illustrated may be associated with a main circuit to be controlled (not shown) in some applications or it may be utilized by itself. The detector will control the supply of current to the heater R to the extent that it will permit current to flow from one foil to the other across the temperature sensitive element 2 only when the temperature of the tablet 14 in the element 2 falls within the range at which the electrical resistance of the tablet material has been lowered to the point whereby it has been changed from an electrical insulator to an electrical conductor. When this occurs, the circuit is completed and the heater R is energized. The heater R may be associated with control components of the main circuit, such as a bimetal, to open the main circuit. It should be clearly understood that components other than a heater may be used. If it is desired to employ a detector solely to signify the reaching of a predetermined temperature, an appropriate electrical signal may be employed.

A temperature sensitive element of this type permits a flow of current across the tablet 14 close to the peak current that the electrolyte is capable of transmitting. This obtains because the foils are good thermal conductors and good radiant heat absorbers, and because they have excellent electrical contact with the tablet; this arrangement produces the effect of the foils being separated by an infinite number of short conductive routes through the tablet, which are equivalent to a plurality of impedances in parallel. Therefore, when conduction occurs due to the change in temperature of the tablet, there will be an appreciable total flow of current in response to a relatively small increase in conductance. This affords extreme sensitivity and rapid recovery from temperature changes.

The ease with which these temperature sensitive elements may be manufactured will become apparent from the following explanation:

Figures 4 and 5 are schematic representations of the steps in manufacturing these elements. Starting at the left-hand side of both figures, step A signifies a strip 30 of insulating plates being continuously fed to the assembly point. At point B a lower foil 10, having its marginal portions coated with a bonding agent, is placed beneath the strip 30 in position over an opening 20 with its coated side facing the strip. At point C a tablet 14 is placed within the opening 20. At point D an upper foil 8, having its marginal portions coated with a bonding agent, is placed over the strip 30 and tablet 14 with its coated side facing the strip. At point E the assembled parts enter a commercial type vacuum chamber V which houses a heated press W. Here the components are worked on by the press W which subjects their marginal portions to heat and pressure; this squeezes out air from between the parts causing the foils to closely embrace the tablet and causing the bonding agent 16 and 18 on the metal foils to bond the foils to the strip 30. During the preceding step, the surface of the tablet is momentarily melted, thereby causing bonding action between the tablet and foils when they cool. If there is a compound impregnated in or coated to the strip 30 it aids in joining the foils to the strip. If bonding agent is not applied to the foils, but to the strip only, of course, the bond will be accomplished by the agent on the strip. The press W has a knife edge X which separates strip 30 into individual elements 2. Elements produced in the foregoing manner are moisture tight, flexible, highly efficient, temperature sensitive elements which perform outstandingly and which lend themselves to mass production methods. The elements may be made to function at any desired temperature and in different sizes. When made in sizes of postage stamp size and under they are very durable. If the element is to be used in an application wherein it will respond primarily to radiant energy, as when it is used as a toaster color control, the foils may be treated, as by blacking their exposed surfaces, to increase their radiant energy receptivity.

As will be evident from the foregoing description, certain aspects of my invention are not limited to the particular details of construction of the example illustrated, and I contemplate that various other modifications and applications will occur to those skilled in the art. It is therefore my intention that the appended claims shall cover such modifications and applications as do not depart from the true spirit and scope of my invention.

What I claim as new and desire to secure by Letters Patent of the United States is:

1. In a temperature detector, a temperature sensitive element comprising a pair of spaced generally flat electricity conducting foils and a mass of a thermo-sensitive electrolyte disposed therebetween.

2. In a temperature detector, a temperature-sensitive element comprising a pair of spaced electricity conducting foils and a mass of thermo-sensitive electrolyte disposed therebetween, said mass comprising a material selected from the group consisting of oxalic acid, formic acid and acetamide.

3. In a temperature detector, a temperature-sensitive element comprising a pair of spaced electricity conducting foils and a mass of thermo-sensitive electrolyte disposed therebetween, said mass comprising oxalic acid.

4. A device as defined in claim 1 wherein said mass is bonded to said foils.

5. In a temperature detector, a temperature sensitive element comprising a pair of spaced electricity conducting foils, a tablet of a thermo-sensitive electrolyte positioned therebetween and an insulator between said foils and surrounding said tablet.

6. A device as defined in claim 5 wherein said tablet is bonded to said foils.

7. In a temperature detector, a temperature sensitive element comprising an apertured insulator plate, a tablet of a thermo-sensitive electrolyte in said aperture, and a pair of electricity conducting foils, one of said foils being disposed on each side of said tablet with a portion thereof bonded to said plate.

8. A device as defined in claim 7 wherein said tablet is bonded to said foils.

9. A temperature detector comprising a temperature sensitive element and a pair of brackets made of electrical conducting material, said element comprising an apertured insulating plate, a mass of a thermo-sensitive electrolyte positioned in said aperture, a pair of electricity conducting foils of less length than said plate, one of said foils positioned centrally on each side of said mass, whereby a portion of said plate at each end thereof extends beyond the end of said foils, the portion at one end being folded back on itself and being adjacent one of said foils, the portion at the other end being folded back on itself and being adjacent the other of said foils, said brackets supporting said element, one bracket at one end thereof and contacting one of said foils, and the other bracket at the other end and contacting the other of said foils, whereby each bracket constitutes an electrical terminal for a separate one of said foils.

10. A device as defined in claim 9 wherein said mass is bonded to said foils.

11. A device as defined in claim 10 wherein said foils are bonded to said plate.

12. A device as defined in claim 9 wherein said foils are bonded to said plate.

13. A device as defined in claim 9 wherein one of said brackets is crimped onto a folded back portion of said plate and one of the foils and the other of said brackets is crimped onto the other folded back position and the other foil.

14. A method of making a temperature sensitive element comprising the steps of forming a strip of insulating material having a plurality of apertures, impregnating said strip with a bonding agent, positioning a tablet of a thermo-sensitive electrolyte in each aperture, forming electricity conducting foils, positioning a foil on each side of each tablet, and applying heat and pressure to the assembled parts to thereby bond said foils to said strip.

15. A method of making a temperature sensitive element comprising the steps of forming a strip of insulating material having a plurality of apertures, positioning a tablet of a thermo-sensitive electrolyte in each aperture, forming electricity conducting foils with a bonding agent on the marginal portions of one side of each foil, positioning a foil on each side of each tablet with said bonding agent adjacent to the portion of the plate surrounding the aperture, and applying heat and pressure to said foils to thereby bond said foils to said plate.

16. A method of making a temperature detector comprising the steps of forming an apertured plate of a flexible insulating material, positioning a tablet of a thermo-sensitive electrolyte in said aperture, forming electricity conducting foils of less length than said plate, bonding a foil to each side of said plate in position to completely cover said tablet and to partially cover said plate, thereby leaving a portion of said plate at each of its ends exposed, folding one of said exposed end portions back on itself toward one of said foils and the other exposed end portion back on itself toward the other of said foils, and securing a terminal to each of said folded back portions and a foil in such a manner as to have one terminal contact one of said foils and the other terminal contact the other of said foils.

17. A method as defined in claim 16 wherein said securing step comprises crimping said terminals around said folded back portions and their associated foils.

18. A method of making a temperature sensitive element comprising an apertured insulating plate, a tablet of a thermo-sensitive electrolyte in said aperture and a pair of electricity conducting foils, one of said foils on each side of said tablet and secured to said plate and said tablet, comprising the steps of forming an apertured plate of an insulating material, positioning a tablet of a thermo-sensitive electrolyte in said aperture and a foil on each side of said tablet, bonding the marginal portions of foils to said plate, momentarily melting the surfaces of said tablet adjacent to said foils, and thereafter cooling said surfaces and said foils to thereby bond them to each other.

19. A method of making a temperature sensitive element comprising an apertured insulating plate, a tablet of a thermo-sensitive electrolyte in said aperture and a pair of electricity conducting foils, one of said foils on each side of said tablet and secured to said plate and said tablet, comprising the steps of forming an apertured plate of an insulating material, positioning a tablet of a thermo-sensitive electrolyte in said aperture and a foil on each side of said tablet, bonding the marginal portions of said foils to said plate, simultaneously with the bonding step momentarily melting the surfaces of said tablet adjacent to said foils, and thereafter cooling said surfaces and said foils to thereby bond them to each other.

References Cited in the file of this patent

UNITED STATES PATENTS

| | | |
|---|---|---|
| 2,085,958 | Curtis | July 6, 1937 |
| 2,487,526 | Dahm et al. | Nov. 8, 1949 |
| 2,530,956 | Gibney | Nov. 21, 1950 |
| 2,606,986 | Sweger | Aug. 12, 1952 |